(12) United States Patent
Vilaipornsawai et al.

(10) Patent No.: US 9,787,515 B2
(45) Date of Patent: Oct. 10, 2017

(54) SYSTEM AND METHOD FOR GUARD BAND UTILIZATION FOR SYNCHRONOUS AND ASYNCHRONOUS COMMUNICATIONS

(71) Applicant: Huawei Technologies Co., Ltd., Shenzhen (CN)

(72) Inventors: Usa Vilaipornsawai, Nepean (CA); Javad Abdoli, Kanata (CA); Jianglei Ma, Ottawa (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/161,023

(22) Filed: May 20, 2016

(65) Prior Publication Data
US 2016/0269212 A1 Sep. 15, 2016

Related U.S. Application Data

(63) Continuation-in-part of application No. 14/821,575, filed on Aug. 7, 2015, which is a continuation of (Continued)

(51) Int. Cl.
*H04L 27/28* (2006.01)
*H04L 27/26* (2006.01)
(Continued)

(52) U.S. Cl.
CPC ...... *H04L 27/2627* (2013.01); *H04L 27/2607* (2013.01); *H04L 27/34* (2013.01); *H04L 27/345* (2013.01); *H04L 5/0007* (2013.01)

(58) Field of Classification Search
CPC .. H04L 27/2626; H04L 27/263; H04L 27/264
(Continued)

(56) References Cited

U.S. PATENT DOCUMENTS

| 5,818,827 A | 10/1998 | Usui et al. |
| 2005/0270969 A1 | 12/2005 | Han et al. |

(Continued)

FOREIGN PATENT DOCUMENTS

| CN | 101778392 A | | 7/2010 |
| WO | WO2014/123926 | * | 8/2014 |

OTHER PUBLICATIONS

Chen, W., et al., "Research on Utilizing Guard Band in LTE Uplink Co-Existence Based on Uncoordinated Deployment Scenario" IET International Conference on Communication Technology and Application, Oct. 14-16, 2011, pp. 441-446.

(Continued)

*Primary Examiner* — Kevin Kim
(74) *Attorney, Agent, or Firm* — Slater Matsil, LLP

(57) ABSTRACT

Embodiments are provided for guard band utilization for synchronous and asynchronous communications in wireless networks. A user equipment (UE) or a network component transmits symbols on data bands assigned for primary communications. The data bands are separated by a guard band having smaller bandwidth than the data bands. The UE or network component further modulates symbols for secondary communications with a spectrally contained wave form, which has a smaller bandwidth than the guard band. The spectrally contained wave form is achieved with orthogonal frequency-division multiplexing (OFDM) modulation or with joint OFDM and Offset Quadrature Amplitude Modulation (OQAM) modulation. The modulated symbols for the secondary communications are transmitted within the guard band.

20 Claims, 11 Drawing Sheets

Related U.S. Application Data application No. 14/180,147, filed on Feb. 13, 2014, now Pat. No. 9,137,074.

(51) Int. Cl.
*H04L 27/34* (2006.01)
*H04L 5/00* (2006.01)

(58) Field of Classification Search
USPC .......................................................... 375/260
See application file for complete search history.

(56) References Cited

U.S. PATENT DOCUMENTS

| | | |
|---|---|---|
| 2010/0118994 A1 | 5/2010 | Park et al. |
| 2011/0207496 A1 | 8/2011 | Cho et al. |
| 2011/0286370 A1 | 11/2011 | Tang et al. |
| 2013/0016765 A1* | 1/2013 | Park .................. H04L 25/03 375/224 |
| 2013/0028346 A1 | 1/2013 | Hottinen |
| 2014/0192848 A1 | 7/2014 | Rao et al. |
| 2014/0254404 A1 | 9/2014 | Ratnakar |
| 2015/0003542 A1 | 1/2015 | Barbu et al. |
| 2015/0372843 A1* | 12/2015 | Bala .................. H04L 25/03834 375/295 |

OTHER PUBLICATIONS

Farhang-Boroujeny, B., et al., "Multicarrier Communication Techniques for Spectrum Sensing and Communication in Cognitive Radios," IEEE Communications Magazine, vol. 46, No. 4, Apr. 2008, pp. 80-85.

Yuan, Z., et al., "On Sidelobe Suppression for Multicarrier-Based Transmission in Dynamic Spectrum Access Networks," IEEE Transactions on Vehicular Technology, vol. 59, No. 4, May 2010, pp. 1998-2006.

* cited by examiner

SYSTEM AND METHOD FOR GUARD BAND UTILIZATION FOR SYNCHRONOUS AND ASYNCHRONOUS COMMUNICATIONS

CROSS REFERENCE TO RELATED APPLICATIONS

This application is a continuation in part application of U.S. patent application Ser. No. 14/821,575, entitled "System and Method for Guard Band Utilization for Synchronous and Asynchronous Communications" filed Aug. 7, 2015, which is a continuation application of U.S. patent application Ser. No. 14/180,147 entitled "System and Method for Guard Band Utilization for Synchronous and Asynchronous Communications" filed Feb. 13, 2014, all of which are hereby incorporated by reference in their entireties.

TECHNICAL FIELD

The present invention relates to the field of wireless communications, and, in particular embodiments, to a system and method for guard band utilization for synchronous and asynchronous communications.

BACKGROUND

Orthogonal frequency-division multiplexing (OFDM) is a method of encoding digital data on multiple carrier frequencies. The OFDM scheme is currently deployed in broadband multicarrier communications. However, OFDM suffers from high out of band (OOB) radiation due to the use of a square pulse (e.g., a sinc function in frequency domain) on each subcarrier. A guard band can be used to avoid interference between two bands due to OOB radiation. Filtered OFDM (F-OFDM) is a scheme in which a filtering is applied to a sequence of OFDM symbols to reduce OOB radiation. The F-OFDM scheme has benefits of OFDM, e.g., simple equalization, channel estimation, and suitability for multiple-input and multiple-output (MIMO) transmissions. OFDM/Offset Quadrature Amplitude Modulation (OQAM) is a filter bank multicarrier (FBMC) scheme which uses a time/frequency localized pulse shaping over each subcarrier to yield a spectrally contained waveform. This scheme provides a relatively well contained spectrum and is suitable for synchronous/asynchronous communications. Another other FBMC schemes can also be considered. In the OFDM scheme, the guard band is not exploited for data transmission, which results in loss of spectral efficiency. There is a need for a scheme that allows opportunistic radio communications and improves spectral efficiency for synchronous/asynchronous communications.

SUMMARY OF THE INVENTION

In accordance with an embodiment of the disclosure, a method increasing band utilization by a network component in a wireless network includes allocating secondary communications to a guard band. The guard band separates data bands assigned for primary communications and has a smaller bandwidth than the data bands. The method further includes modulating, at the network component, symbols for the secondary communications with a spectrally contained wave form. The spectrally contained wave form has a smaller bandwidth than the guard band. The network component transmits the modulated symbols for the secondary communications within the guard band.

In accordance with another embodiment of the disclosure, a network component for increasing band utilization in a wireless network includes at least one processor and a non-transitory computer readable storage medium storing programming for execution by the processor. The programming includes instructions to allocate secondary communications to a guard band. The guard band separates data bands assigned for primary communications and has a smaller bandwidth than the data bands. The programming further configures the network component to modulate symbols for the secondary communications with a spectrally contained wave form. The spectrally contained wave form has a smaller bandwidth than the guard band. The network component is further configured to transmit the modulated symbols for the secondary communications within the guard band.

In accordance with another embodiment of the disclosure, a method increasing band utilization by a network component in a wireless network includes receiving secondary communications within a guard band. The guard band separates data bands assigned for primary communications and has a smaller bandwidth than the data bands. The network component further detecting, in the received secondary communications, symbols modulated according to a spectrally contained wave form. The spectrally contained wave form has a smaller bandwidth than the guard band.

In accordance with yet another embodiment of the disclosure, a network component for increasing band utilization in a wireless network includes at least one processor and a non-transitory computer readable storage medium storing programming for execution by the processor. The programming includes instructions to receive secondary communications within a guard band. The guard band separates data bands assigned for primary communications and has a smaller bandwidth than the data bands. The programming includes further instructions to detect, in the received secondary communications, symbols modulated according to a spectrally contained wave form. The spectrally contained wave form has a smaller bandwidth than the guard band.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for guard band utilization for synchronous and asynchronous communications. Specifically, spectrally contained waveforms are used for communications in the guard bands, which separate primary data bands of the system to account for OOB radiation. Due to the spectrally contained waveforms, the guard bands can be used for secondary communications, thereby increasing the spectral efficiency of the system. For instance, the primary system can use OFDM or its variant, e.g., time windowing OFDM (TW-OFDM), discrete Fourier transform-spread OFDM (DFT-S-OFDM) or Filtered OFDM (F-OFDM), for communications in the primary data bands. A primary band is at a center of a primary bandwidth, which also includes two guard bands on the edges of the primary data band. The secondary system can use the spectrally contained waveforms in the guard bands. The primary system provides primary services or data channels for users of the primary system, and the secondary system provides secondary services or data channels to different users. Alternatively, the secondary system can be used in signaling or other applications for the primary system. The primary services or data channels may have higher quality or priority than the secondary services or data channels.

Figure 1:
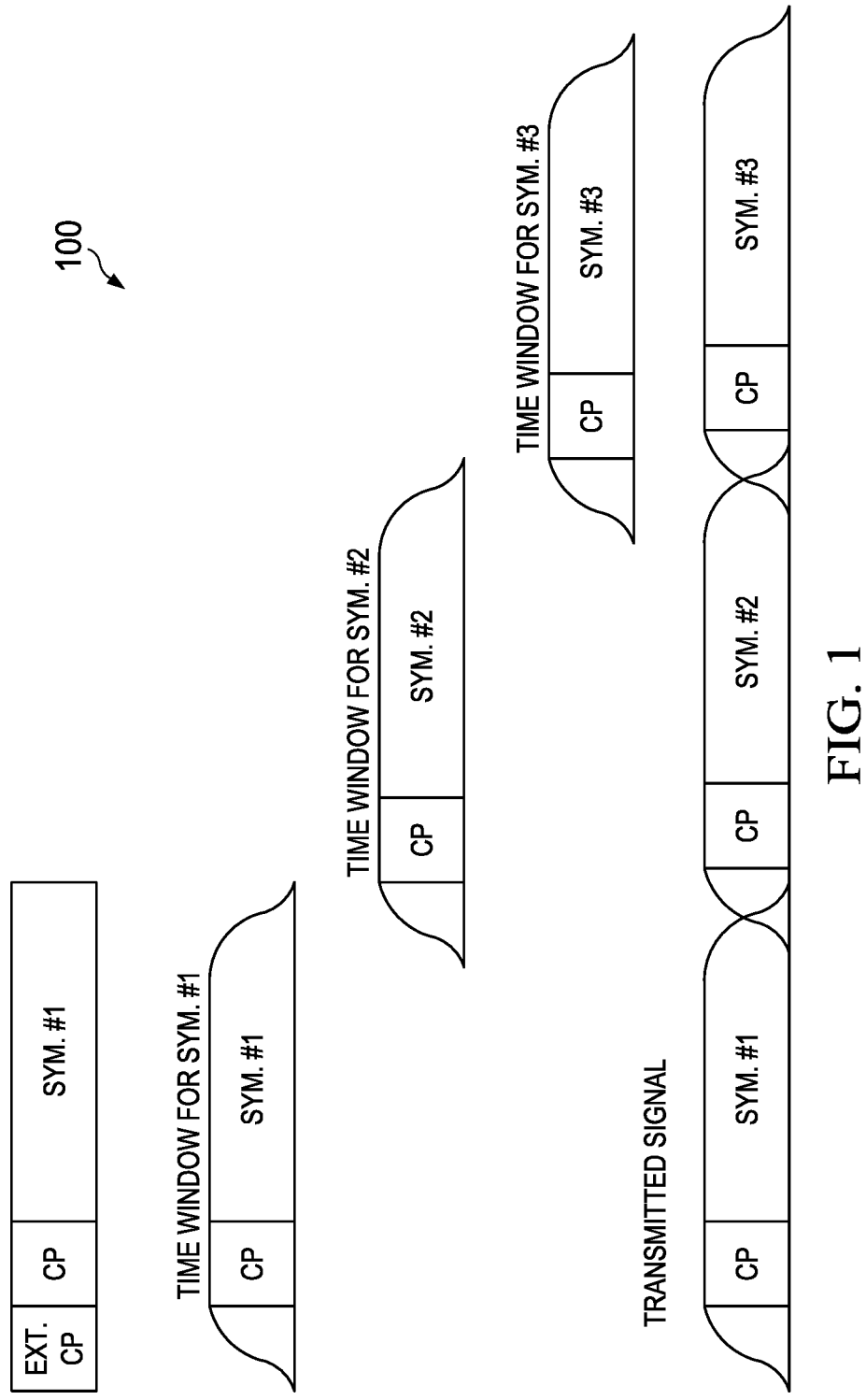
FIG. 1 illustrates an example of a time windowing operation to smooth discontinuity between OFDM symbols.

The spectrally contained waveforms include schemes such as TW-OFDM, F-OFDM and OFDM/Offset Quadrature Amplitude Modulation (OQAM). For example, the TW-OFDM or F-OFDM is used for synchronous communications. The OFDM/OQAM is used for synchronous and asynchronous communications. Further, the secondary system are aware of the primary system and the secondary communications using the spectrally contained waveforms in the guard bands can be configured to avoid interference with communications in the primary data bands. FIG. 1 shows an example of a time windowing operation 100 to smooth discontinuity between OFDM symbols. The time windowing (TW) operation 100 is used to smooth the transitions (discontinuity) between consecutive OFDM symbols to prevent a high OOB.

Figure 2:
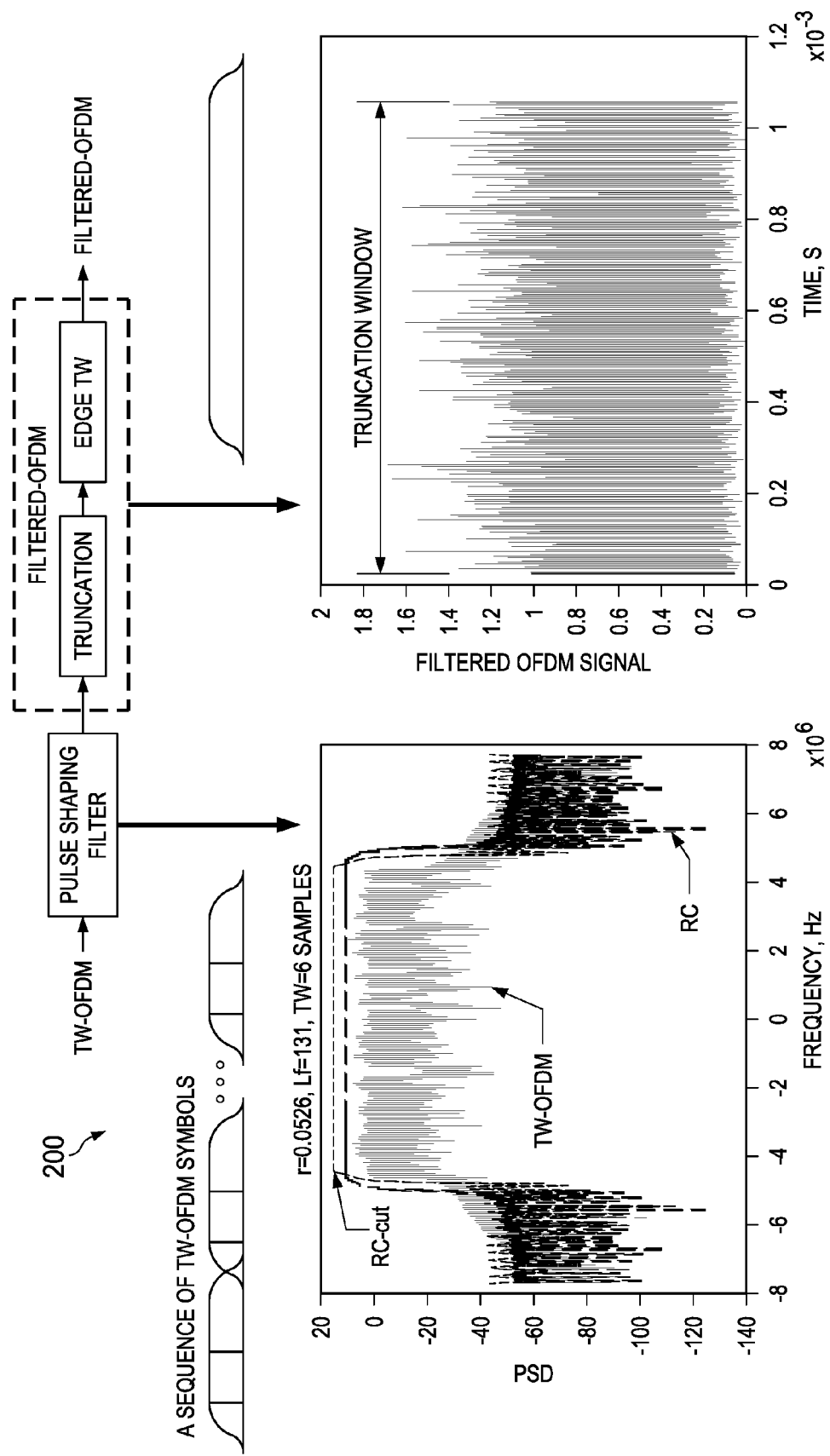
FIG. 2 illustrates an implementation of a filtered time windowing OFDM transmitter system.

FIG. 2 shows one possible implementation of a filtered time windowing OFDM (F-TW-OFDM) transmitter system 200. The F-TW-OFDM is one implementation of the general F-OFDM scheme. The transmitter system can be part of a user equipment (UE) or a base station in a wireless network. As used herein, the term base station refers to any radio access node capable of communicating wireless signals with UEs or other wireless communications devices. For example, a base station may be a NodeB as defined in Universal Mobile Telecommunications Systems (UMTS), or an eNodeB as defined in Long Term Evolution (LTE) systems. In the processing chain in the F-TW-OFDM transmitter system 200, each OFDM symbol is first time-windowed according to the time windowing operation 100. The resulting signal (the sequence of TW-OFDM symbols) is then passed through a pulse shaping filter. However, due to the linear filtering, the filtered signal is expanded in time. In practice, the truncation is performed on the signal to reduce such time expansion (to reduce overhead). However, the truncated signal has abrupt discontinuities at the signal edges, resulting in high OOB. Therefore, another TW process (Edge TW) is needed to smooth out the edges of the truncated signal.

Figure 3:
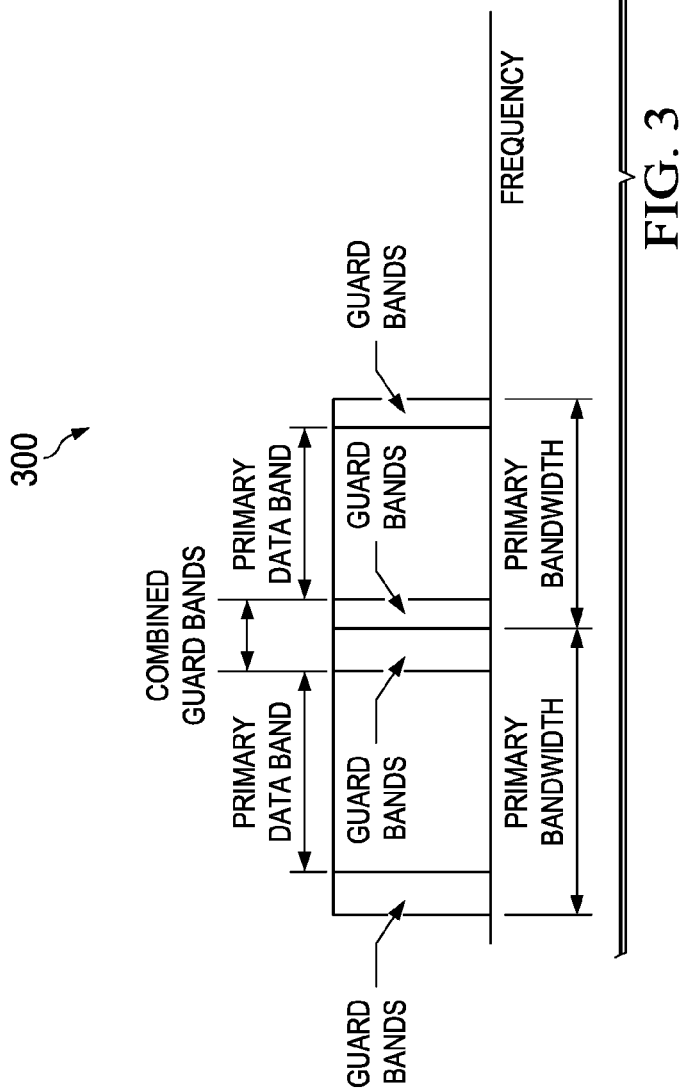
FIG. 3 illustrates an embodiment of a guard band availability scheme.

FIG. 3 shows an embodiment of a guard band availability scheme. In the scheme, multiple primary assigned bandwidths, each including a primary data band surrounded by guard bands. The data bands are used by the primary system, e.g., with OFDM or F-OFDM or TW-OFDM. The guard bands are used by the secondary system with F-OFDM, TW-OFDM, OFDM/OQAM or other spectrally contained waveforms. The guard bands on each side of a data band can be used individually as a single band to carry secondary information. Alternatively, two adjacent guard bands belonging to two consecutive data bands can be combined into a single band for the secondary system. Examples of available guard bands in Long Term Evolution (LTE) systems include guard bands with 0.16 MHz on each side of a data band in 1.4 MHz primary bandwidth, and guard bands with 1 MHz on each side of a data band in 20 MHz primary bandwidth. Other examples are shown in FIG. 3.

Figure 4:
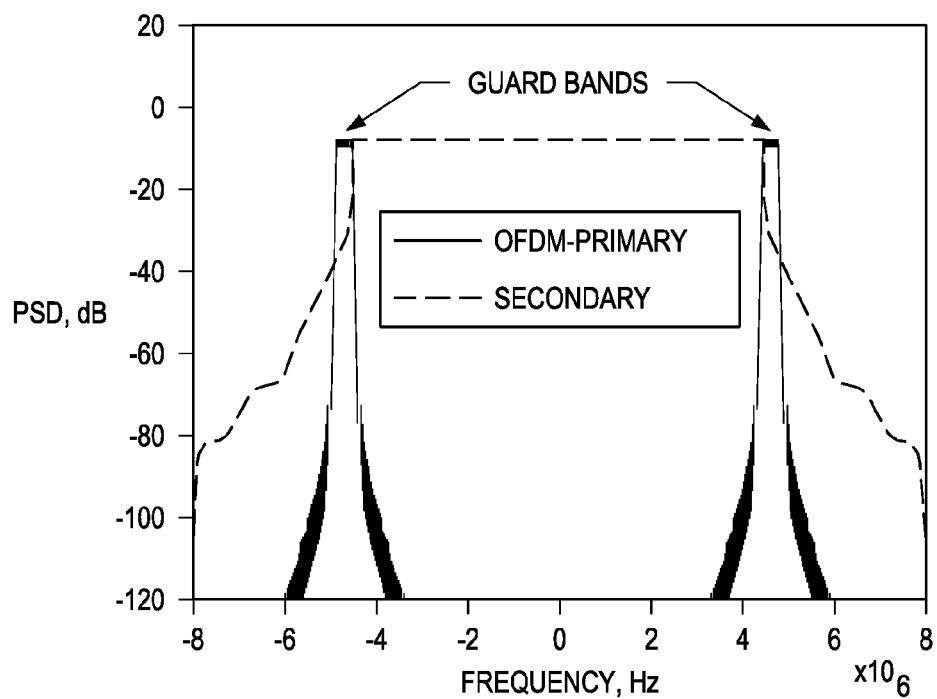
FIG. 4 illustrates an embodiment of a guard band utilization scheme.
Figure 5:
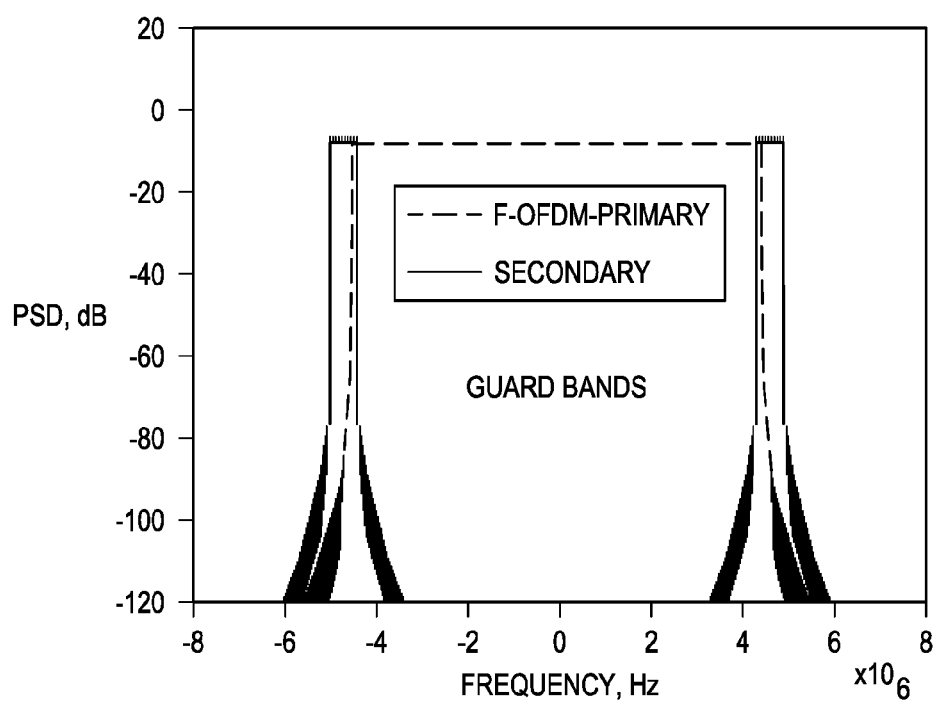
FIG. 5 illustrates another embodiment of a guard band utilization scheme.

FIG. 4 shows an embodiment of a guard band utilization scheme. Specifically, a primary system can use OFDM symbols or waveforms in the data bands, and a secondary system can use a spectrally contained waveform, such as F-OFDM or OFDM/OQAM, in the guard bands. FIG. 5 shows another embodiment of a guard band utilization scheme. Specifically, a primary system can use F-OFDM waveform in the data bands, and a secondary system can use a spectrally contained waveform, such as F-OFDM or OFDM/OQAM, in the guard bands. In the embodiments above, the OFDM waveform can be F-OFDM waveform. This allows limited OOB radiation to the secondary system. Further, the use of the spectrally contained waveforms in the guard bands allows no or tolerable interference with the data in the data bands. Further, the spectrally contained waveforms, for example using F-OFDM or TW-OFDM or OFDM/OQAM, have a smaller bandwidth than the guard bands.

In an embodiment, a synchronous secondary system uses F-OFDM waveform in the guard bands. A UE uses synchronization signals from the primary system to synchronize communications for the secondary system. The UE may be a secondary user of the secondary system, or a primary user of the primary system if the secondary system is used in signaling or carrying other information for the primary system The UE can also use its own time-adjustment signals to perform synchronization. Using the synchronization signals of the primary system for the second system reduces overhead, since common signaling is exploited for the two systems. Further, multiple guard bands can be used combined by a single UE or multiple UEs. Alternatively, each guard band can be used by a single UE or multiple UEs. In another embodiment, a synchronous secondary system uses F-OFDM waveform in the guard bands. A UE use dedicated synchronization signals to synchronize communications for the secondary system. This increases overhead since additional synchronization signals are used for the secondary system, but allows more independence between the primary and secondary systems. Further, multiple guard bands can be used combined by a single UE or multiple UEs. Alternatively, each guard band can be used by a single UE or multiple UEs.

Examples of the secondary system include machine-to-machine (M2M) systems, device-to-device (D2D) communications, or other systems that communicate information independent of the primary information of the primary system. In an embodiment, the secondary system communications are transmitted at lower power, such as using pico or femto cell systems, relative to the first system communications. The two communications may serve different purposes. The two communications may have be of the same type (user data) but transmitted at different power levels or have different priority.

In another embodiment, the secondary system uses OFDM/OQAM for both synchronous and asynchronous communications. Multiple guard bands can be used (in combination) by a single UE or multiple UEs. Alternatively, each guard band can be used by a single UE or multiple UEs. Due to the use of well localized pulse shapes in OFDM/OQAM, time asynchronization mainly affects adjacent subcarriers. If a guard band is utilized by multiple UEs in asynchronous mode, then one subcarrier between each pair of adjacent UEs is reserved as a guard in frequency. If a guard band is utilized by a single UE or multiple UEs in synchronous mode, then no reserved subcarriers are required in this guard band. This implementation can have lower OOB radiation in comparison to F-OFDM deployment. However, this OFDM/OQAM deployment can also have higher peak-to-average power ratio (PAPR) in uplink and higher complexity.

Figure 6:
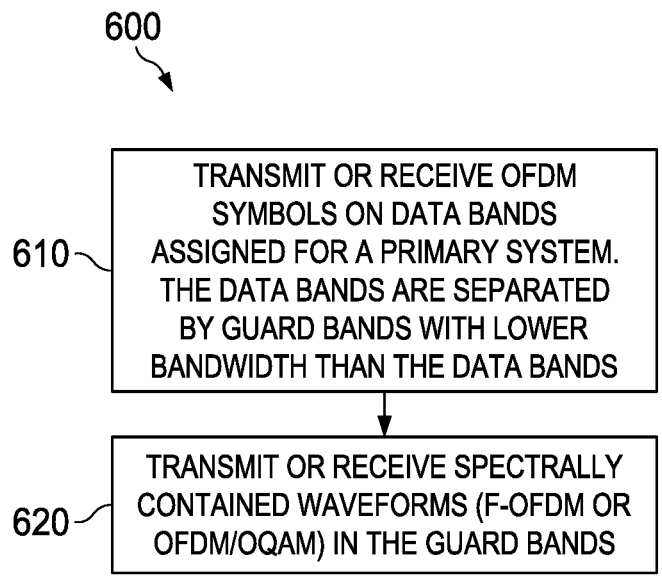
FIG. 6 illustrates an embodiment of a method for guard band utilization for synchronous and/or asynchronous communications.

FIG. 6 shows an embodiment of a method 600 for guard band utilization for synchronous and/or asynchronous communications. The method 600 can be implemented by a UE, a base station or other transmitters in wireless network. At step 610, the network component transmits or receives OFDM symbols within data bands assigned for primary communications. Specifically, the data bands are separated by guard bands, which have smaller bandwidth than the data bands. The OFDM symbols can be F-OFDM symbols. At step 620, the network component transmits or receives, within the guard bands, symbols for secondary communications. The symbols are modulated with a spectrally contained wave form according to OFDM modulation or according to joint OFDM and Offset Quadrature Amplitude Modulation (OQAM) modulation.

Figure 7:
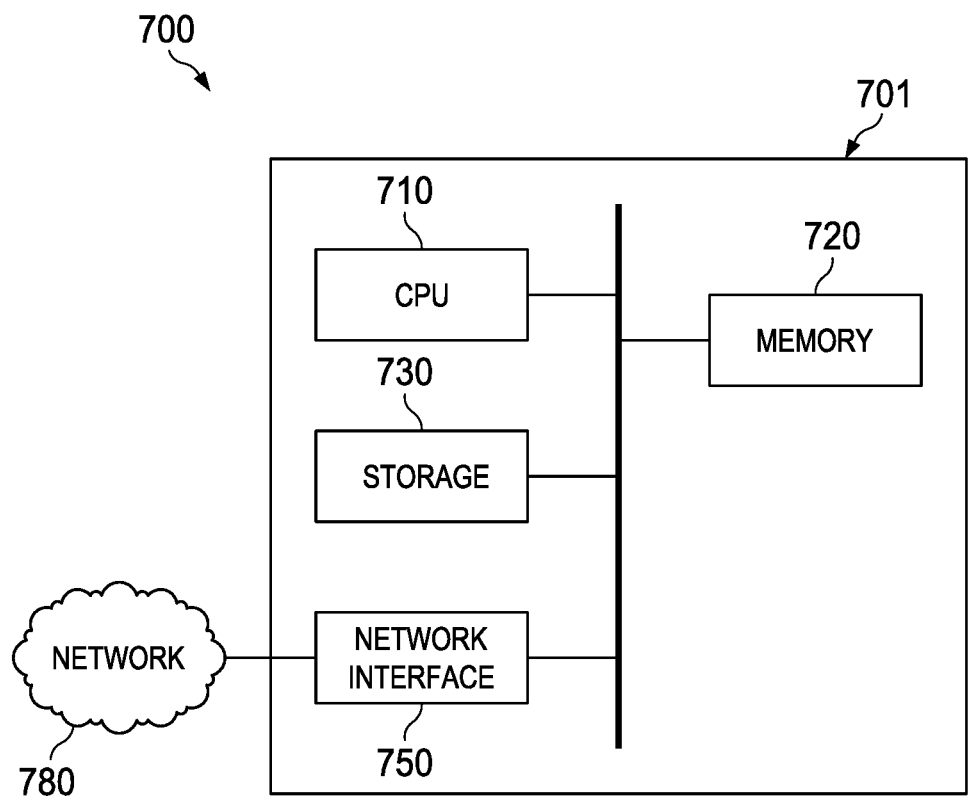
FIG. 7 is a diagram of a processing system that can be used to implement various embodiments.

FIG. 7 is a block diagram of an exemplary processing system 700 that can be used to implement various embodiments. For instance, the system 700 may be part of a network component, such as a base station, a relay, a router, a gateway, or a controller/server unit. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a network interfaces, storage interfaces, and the like. The processing unit 701 may include a central processing unit (CPU) 710, a memory 720, and a storage device 730 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The storage device 730 may comprise any type of storage device configured to store data, programs, and other information and to make the data, programs, and other information accessible via the bus. The storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

Various applications have different traffic types and requirements. For example, applications such as narrowband internet of things (NB-IoT), enhanced mobile broadband (eMBB), massive machine type communications (mMTC), and ultra-reliable and low latency communications (URLLC), can be implemented. Various embodiments of these applications may be implemented by using single or multiple subbands. In various further embodiments, multiple subbands can be used where the subbands are all in the data band, in guard bands, or in the data band and the guard band. For example, in applications such as NB-IoT two subbands can be transmitted by transmitting both of them in the data band, one in the data band and one in the guard band or both in the guard bands. In various embodiments, the subbands can have different bandwidths and use different waveforms.

FIGS. 8A-8D show details and further embodiments of the embodiments of FIGS. 1 and 2. FIG. 1 shows a time windowing operation 100 that operates on consecutive OFDM symbols in a subband and overlaps these consecutive OFDM symbols to form an OFDM waveform for the subband. The time windowing operation 100 may be performed in order to smooth the transition between the consecutive OFDM symbols to prevent or reduce OOB.

Figure 8A:
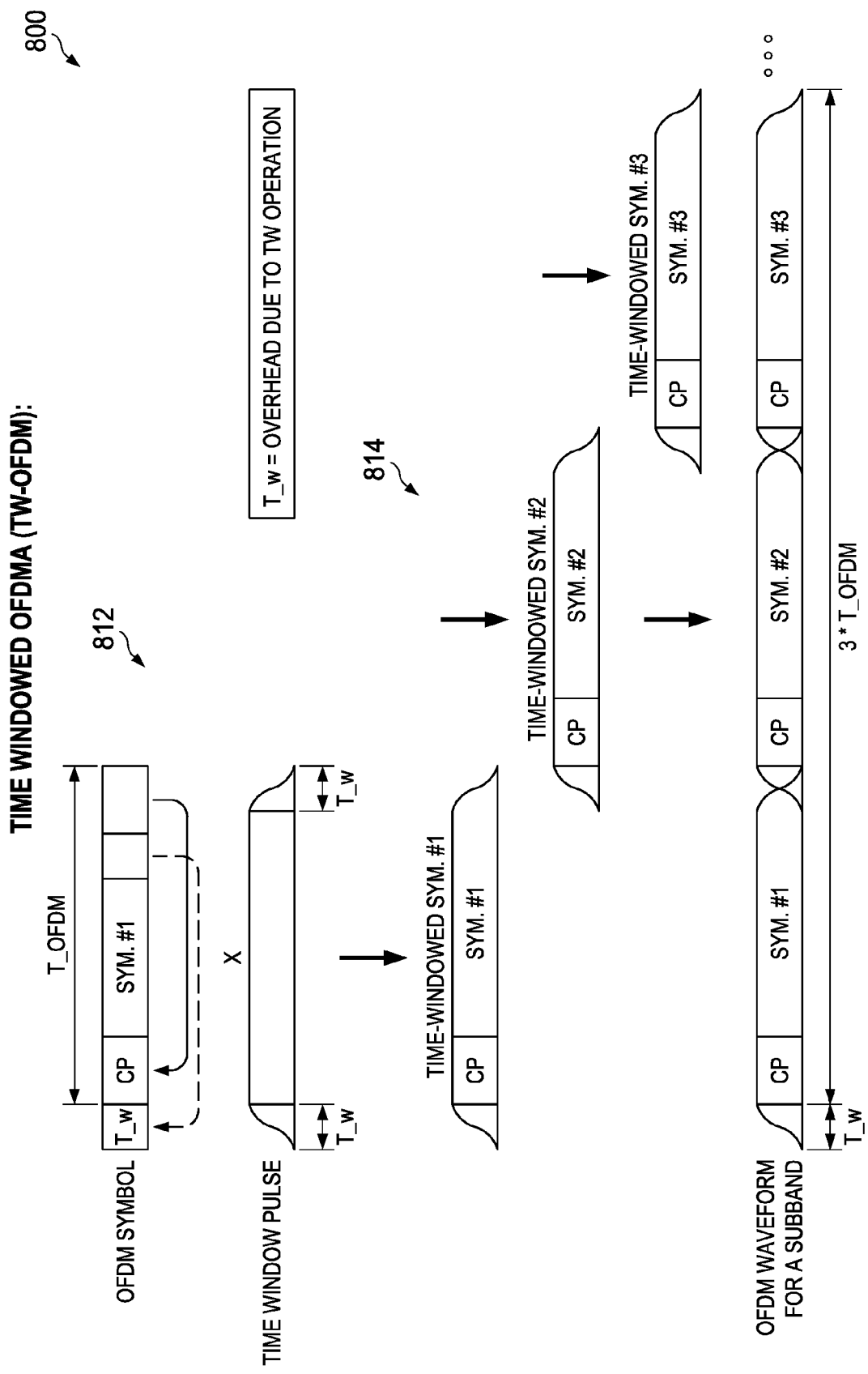
FIG. 8A-8C show time windowing operations according to embodiments.

FIG. 8A shows details of a time windowing operation 800 according to an embodiment.

A symbol time windowing operation (TW operation) 800 is an operation performed on a time-domain waveform by multiplying element-wise (sample-wise or symbol-wise) the time-domain waveform with a time-window pulse. The time widow pulse has smooth transitions on the two edges. In various embodiments, the time-window pulse may have a middle portion of the pulse and transition areas. The middle portion of the pulse may have a constant magnitude 1 and a transition area of the pulse may smoothly decrease from the magnitude 1 to 0 at the edges. The transition area may have a length/duration of T_w. By multiplying the time-domain waveform with the time-window pulse the resulting waveform (or TW-OFDM transmitted signal or TW-OFDM waveform) has smooth transitions on the edges, while being the same in the middle of the waveform. In practice, since the middle portion of the time-window pulse has magnitude 1, only the smooth transitions on the edges of the pulse need to be element-wise multiplied with the two edges of the waveform. An example of a time window pulse may have the following form $w_n$, $$w_n = \begin{cases} 0.5\left(1 + \cos\left(\pi + \pi \cdot \frac{(n+1)}{(T\_w+1)}\right)\right) & \text{, for } n = 0, \ldots, T\_w - 1 \\ 1 & \text{, for } n = T\_w, \ldots, (N_{ofdm} + CP) + T\_w - 1 \\ 0.5\left(1 - \cos\left(\pi \cdot \frac{n}{(T\_w+1)}\right)\right) & \text{, for } n = (N_{ofdm} + CP) + T\_w, \ldots, (N_{ofdm} + CP) + 2 \cdot T\_w - 1 \end{cases}$$

where $N_{OFDM}$, CP, T_w denote the OFDM FFT size (i.e. the number samples per symbol), cycle prefix length in samples, and the one-sided transition area of the time window. In various other embodiments other time window pulses can be used such as a Turkey time window pulse, a Kaiser time window pulse, a Gaussian time window pulse, a Hanning time window pulse, a Hamming time window pulse, etc.

Embodiments of a time windowing (TW) operation 810 may be performed on OFDM symbols in a subband as follows: A time-domain OFDM symbol (with cycle prefix (CP)) is prepared for symbol TW operation. In a first step 812, an Extended Cyclic Prefix (i.e. Ext. CP) with a length equal to a transition area (one-sided smooth time window) of length T_w is added in front of the CP of each symbol. The added portion may be used to cover the time windowing transition period (i.e. the overlap period) between adjacent OFDM symbols. Then, at step 814, the symbol TW operation is applied to the OFDM symbols. Applying the TW operation to smoothen the edges of the OFDM symbols and overlaps the (consecutive) symbols by T_w. By overlapping the TW-OFDM symbols, the overhead due to TW operation is only T_w, regardless of the number of OFDM symbols in the sequence. For example, after the TW operation 800 is performed, a sequence of K OFDM symbols (with CP) of length K*T_OFDMA_original will have the length of K*T_OFDMA_original+T_w. Moreover, overlapping the symbols provides the TW-OFDM waveform to have less amplitude fluctuation, hence, lower peak-to-average power ratio (PAPR). With the TW operation 800, the effective CP length is reduced to be CP−T_w. Hence, the TW operation 800 provides a trade-off between reducing OOB (which increases bandwidth efficiency) and the reducing effective CP length (reduce delay spread tolerance) as well as increasing overhead by T_w. Accordingly, in various embodiments, the time window length T_w is configurable to obtain a preferred time window length T_w as a trade-off of the previously mentioned considerations.

In various embodiments the time window length T_w can vary for the different applications and for the different subbands on which the time window operation is performed in the time domain. The time window length T_w may be less than the length of the CP. In various other embodiments, the resulting waveform of a TW operation is the original OFDM waveform when T_w is 0. In some embodiments, a larger time window length T_w is able to better reduce OOB radiation at the expense of a reduced effective CP length (CP−T_w). Using such a time window length may cause performance degradation and increase overhead. However, the resulting OFDM waveform has only an overhead of T_w regardless of the number of OFDM symbols in the sequence because all other extra introduced T_w overlap between TW-OFDM symbols. Accordingly, using a larger time window length may be worthwhile for longer sequences of OFDM symbols.

Figure 8B:
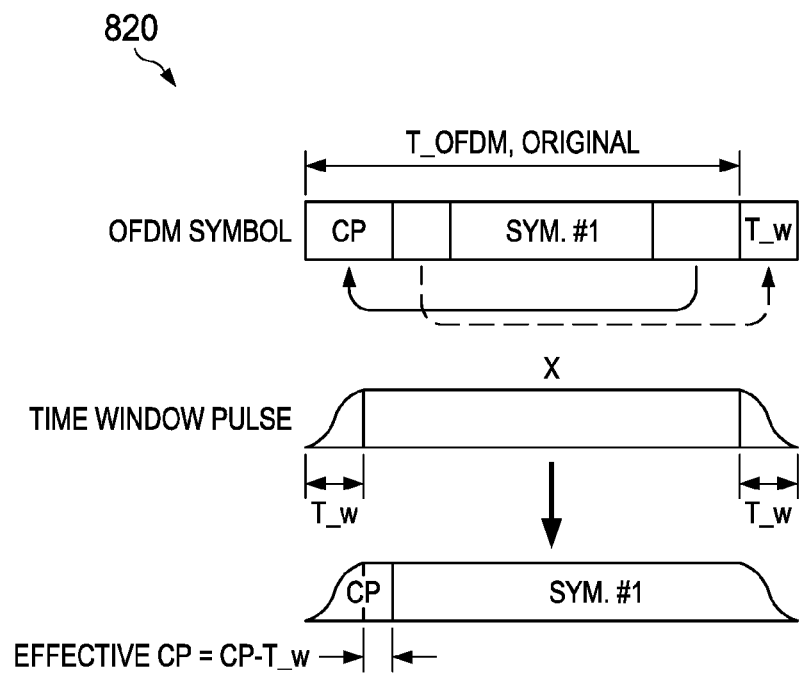
Figure 8C:
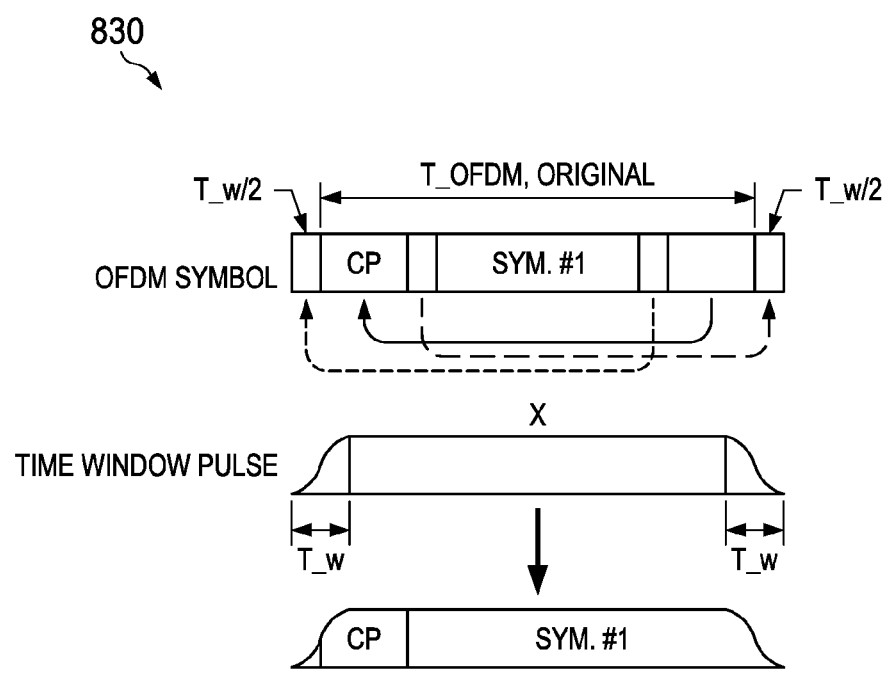

FIG. 8B shows a time windowing operation 820 according to other embodiments. Here, the time-domain OFDM symbols are prepared for the TW operation by adding a cyclic postfix with length T_w to the end of each OFDM symbol. This means that the OFDM symbol is repeating the beginning of OFDM symbol of length T_w at the end of OFDM symbol. The OFDM symbols are then overlapped to form a TW-OFDM waveform. FIG. 8C shows a time windowing operation 830 according to yet other embodiments. Here, the time-domain OFDM symbols are prepared for the TW operation by adding an extended CP of length T_w/2 and a cyclic postfix of length T_w/2 to each OFDMA symbol. Again, the OFDM symbols are then overlapped to form a TW-OFDM waveform. For the implementations of FIGS. 8B and 8C, the effective CP length equals to CP−T_w, and overhead due to the TW operation is also T_w, regardless of the number of OFDM symbols in the sequence.

Figure 8D:
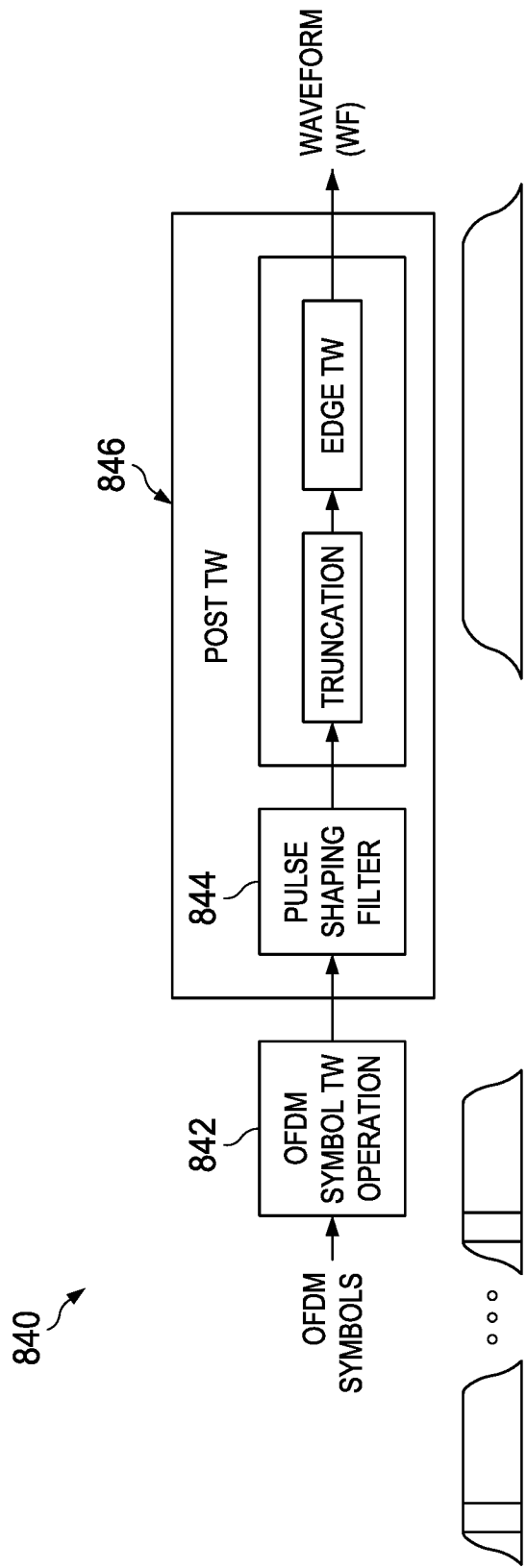
FIG. 8D shows an implementation of a time windowing operation or a filtered time windowing operation according to embodiments.

FIG. 8D shows a possible implementation of a time windowing operation, a filtered operation and/or a filtered time windowing operation according to embodiments. The operation 840 is similar to the one described with respect to the embodiments of FIG. 2. In a first step, at step 842, the method comprises performing a time windowing operation on OFDM symbols in order to form a time windowed OFDM symbols. In the next step, at step 844, the time windowed OFDM symbols are filtered. For example, the TW OFDM symbols are filtered with a pulse shaping filter operation (or through a pulse shaping filter). With a sequence of OFDM symbols as input, each OFDM symbol can be individually time windowed and overlapped as shown in FIGS. 8A-8C (no filtering). The resulting waveform is a time-windowed OFDM waveform. In some embodiments the original OFDM waveform keeps its original form when T_w is equal to zero in the TW operation. In various embodiments, the TW operation is omitted (step 842), and only the filtering operation (844) is performed on the OFDM symbols. If only the filtered operation is performed a filtered OFDM waveform is obtained. As a sequence of OFDM symbols as input, the filtering (convolution between filtering coefficients and OFDM symbols samples) operation on the sequence will automatically make the filtered symbols overlapped. In various other embodiments both TW and filtering operations are performed and a filtered TW OFDM waveform is obtained. In some embodiments, the filter OFDM symbol may be further shaped by a post time windowing operation at step 846. The post time windowing operation 846 may only be performed when the filtering operation is performed on the OFDM symbols. The time windowing operation alone (without the filtering) does not need this processing. Only if it is F-TW operation the post TW may be needed. The post time windowing operation 846 may include a truncation operation and an edge time windowing operation. When the post time windowing operation is performed in various embodiments at least the truncation operation alone or the truncation operation and the edge time windowing operation may be performed.

Due to the capability of transmitters/receivers, for example at the UE side, different combinations of elements in the processing chain can be used/omitted. Moreover, if the requirement is lower in terms of OOB radiation for a particular application, only some elements can be used to reduce processing complexity and power consumption. For example, if the UE has low processing capability and/or OOB radiation requirement is low, then maybe only TW-OFDM is sufficient. In other examples, if the UE needs to save power or reduce power consumption, then less processing may be done. In terms of complexity, TW is the simplest, post-TW is also simple but filtering is more complicated. In terms of OOB radiation, TW can reduce OOB radiation, but less than filtering. The post-TW can further reduce OOB radiation, but the most impact on OOB reduction is filtering. For another example, if the UE has high processing capability and/or OOB requirement is high, then filtering may be required, further improvement in OOB radiation can be obtained with TW and post TW operations, with slight increase in complexity.

Figure 9:
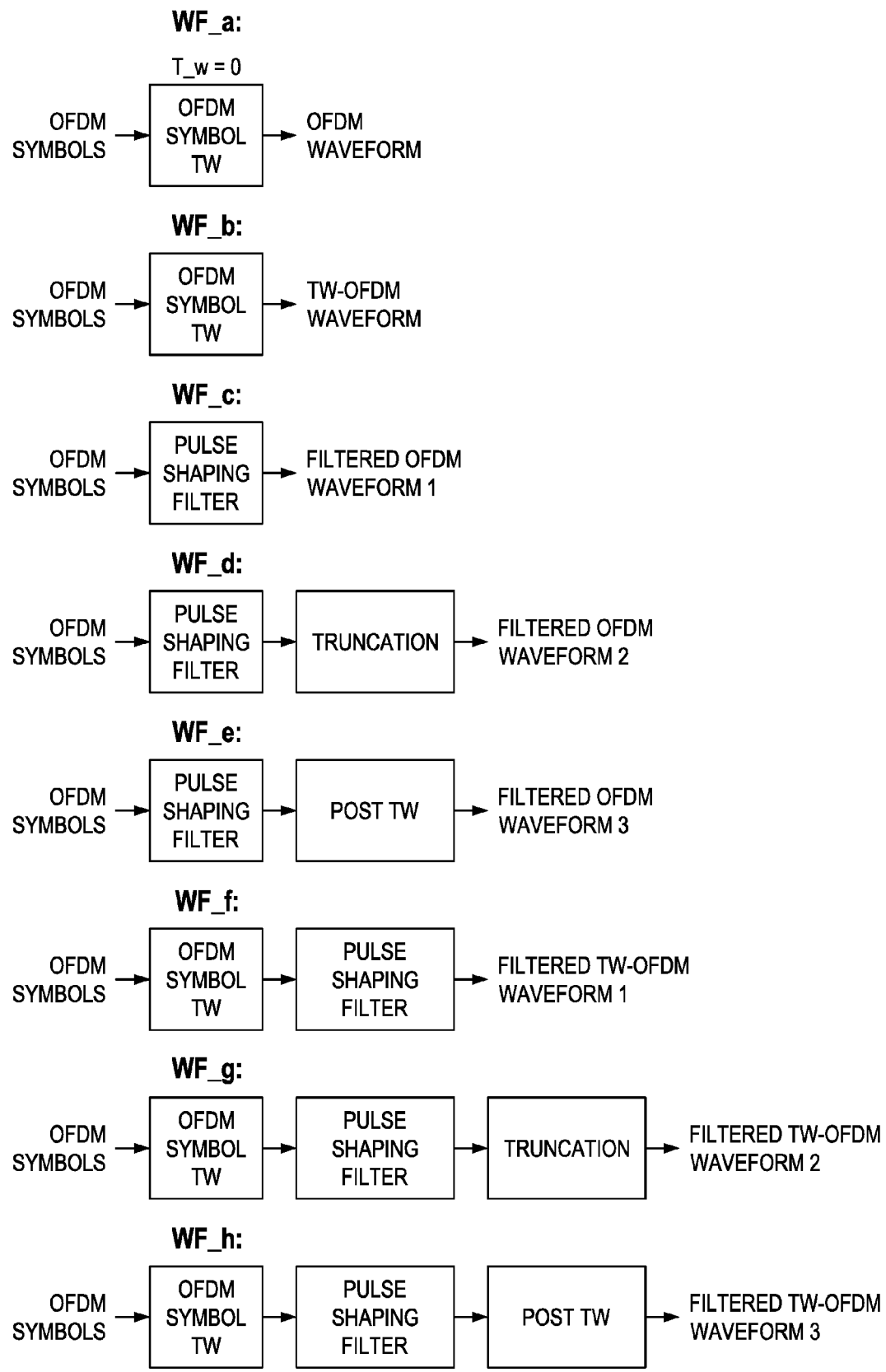
FIG. 9 shows possible wave forms of time windowing and/or filtering operations.

FIG. 9 illustrates various waveforms produced by the operations 842-846 on OFDM symbols according to embodiments. For example, in waveform WF_a time windowing operation 842 is performed for T_w=0 resulting in an original OFDM waveform for the OFDM symbols in a particular subband. In waveform WF_b time windowing operation 842 is performed for T_w>0 resulting in a TW OFDM waveform for the OFDM symbols. In waveform WF_b pulse shape filtering operation 844 is performed resulting in a filtered OFDM waveform for the OFDM symbols. A time windowing operation 842 is not performed on the OFDM symbols. In various embodiments, due to the linear filtering, the filtered signal may be expanded in time; this can cause ISI. In practice, a truncation operation 846 is performed on the signal to reduce such time expansion (to reduce overhead), resulting in WF_d. In yet other embodiments, the truncated signal may have abrupt discontinuities at the signal edges, resulting in higher OOB. Therefore, another (post) time windowed operation (Edge TW) 846 is performed to smooth out the edges of the truncated signal, resulting in WF_e. The combined TW and pulse shaping filter operations 842 and 844 can be used to generate filtered TW OFDM waveforms, shown as WF_f. Similar to the operations performed on the OFDM symbols for WF_d and WF_e, a post time windowing operation 846 can be performed resulting in waveforms for WF_g and WF_h. As discussed earlier, truncation alone, or post TW including truncation and edge TW can be used to generate waveforms WF_g and WF_h, respectively.

Figure 10:
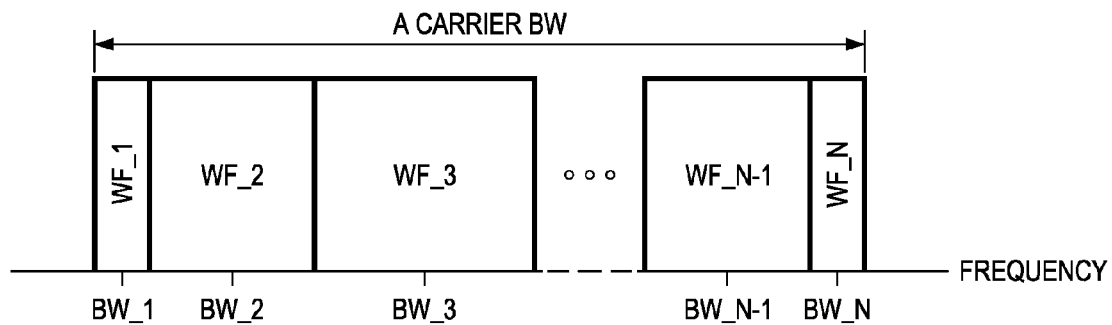
FIG. 10 shows a carrier bandwidth divided in multiple subbands and those subbands can be either in data band or guard bands according to embodiments.

FIG. 10 shows a carrier signal including a data band and two guard bands on each side of the data band. The whole carrier bandwidth (BW) can be divided into multiple subbands. Guard bands on both sides of the data band can provide extra or additional subbands. Each guard band may be divided into a single subband or into a plurality of subbands. The subbands may have different bandwidths and may be created by different waveforms such as OFDM waveforms. For example, subbands SB_1 and SB_N may be guard bands while subbands SB_2 to SB_N−1 comprise the data band. The waveforms which created the different subbands may be OFDM, TW-OFDM, filtered-OFDM, OFDM/OQAM or any other waveforms. For example, subband SB_2 with bandwidth BW_2 may have been generated by waveform WF_2 (e.g., WF_b) and subband SB_3 with bandwidth BW_3 may have been created with WF_3 (e.g., WF_h), etc.

Figure 11:
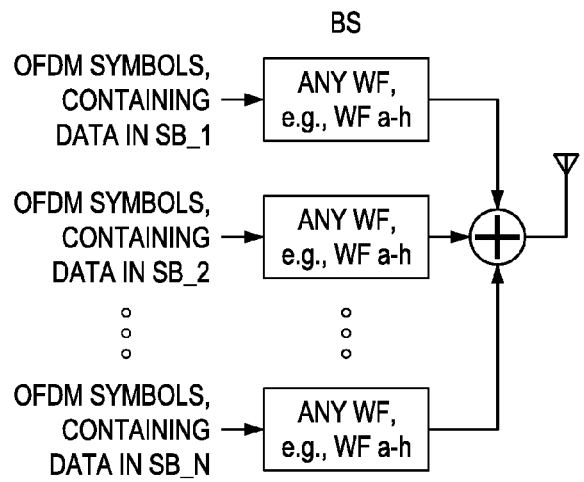
FIG. 11 shows a multicarrier waveform generated by a base station or another transmitter for downlink transmission according to embodiments.

FIG. 11 shows a multi-subband (multi-carrier) waveform generated by a base station (BS) or another transmitter for downlink transmission. The multi-subband waveform may comprise subbands having different waveforms. The transmitter may simply add waveforms of the different subbands to form the multi-subband waveform. For example, the base station or the downlink transmitter may add the OFDM transmitted signal (with an OFDM waveform, e.g., one of WF_a-h) of the first subband to the OFDM transmitted signal (with an OFDM waveform, e.g., one of WF_a-h) of the second subband and to the OFDM transmitted signal (with OFDM waveform, e.g., one of WF_a-h) of the Nth subband. The OFDM waveforms in different subbands may be different or the same. The OFDM waveforms in the subbands may mean that they are different for every subband or different for some subbands but not for other subbands.

An OFDM symbol containing data in a subband (SB_1, SB_2, . . . , SB_N), can be generated by assigning data or QAM symbols to the subcarriers of the subband. The data or QAM symbols are assigned to sub carriers in a band (e.g. data band, subband) which is in frequency domain before being generated to the time-domain OFDM symbol. The QAM symbols are then passed through IFFT and a CP is added to provide an OFDM symbol in the time domain. This is done for each subband individually and separately. The OFDM symbols in the time domain for each subband (or branch in the time domain) are then time windowed, filtered or otherwise processed so that the OFDM waveform (comprising one of the waveforms of FIG. 9) is provided for each subband or branch. The OFDM waveform for subband 1 contains only data from subband 1. The OFDM waveform for subband 2 contains only data from subband 2, etc. The subbands are then summed up, and the final multi subband waveform containing information of all the subbands is transmitted.

In contrast to conventional processing of a OFDM symbol in downlink where QAM symbols from all subbands are passed through one IFFT and added a CP to obtain the OFDM waveform, here multiple OFDM waveforms are generated separately (later combined to be one OFDM multiband waveform with different waveforms for different subbands). The QAM symbols of for a first subband (each comprising one or more subcarriers) is passed through IFFT providing OFDM symbols in a first branch and QAM symbols for a second subband is passed through IFFT separately providing OFDM symbols in a second branch. CP for each branch are added to the OFDM symbols individually. The OFDM symbols for each branch are processed individually and separately in time domain (e.g., time windowing and/or filtering). Afterwards, the processed OFDM symbols of all branches are summed up to provide the final multi-band waveform. The prior art does only one IFFT while various embodiments of the invention provide N separate IFFTs (or N−2 IFFTs) because, in some embodiments the waveforms for the different subbands should be different so that the receiver can dismantle the final multi-band signal (waveform) based on the different subbands. If only one IFFT is performed, it is not possible to generate different waveforms for different subbands. If multiple consecutive subbands use the same waveforms, in this case, all QAM symbols associated with these subbands can pass through the same IFFF and CP can be added. Then, only one processing chain (i.e. TW and/or filtering) is required.

Figure 12:
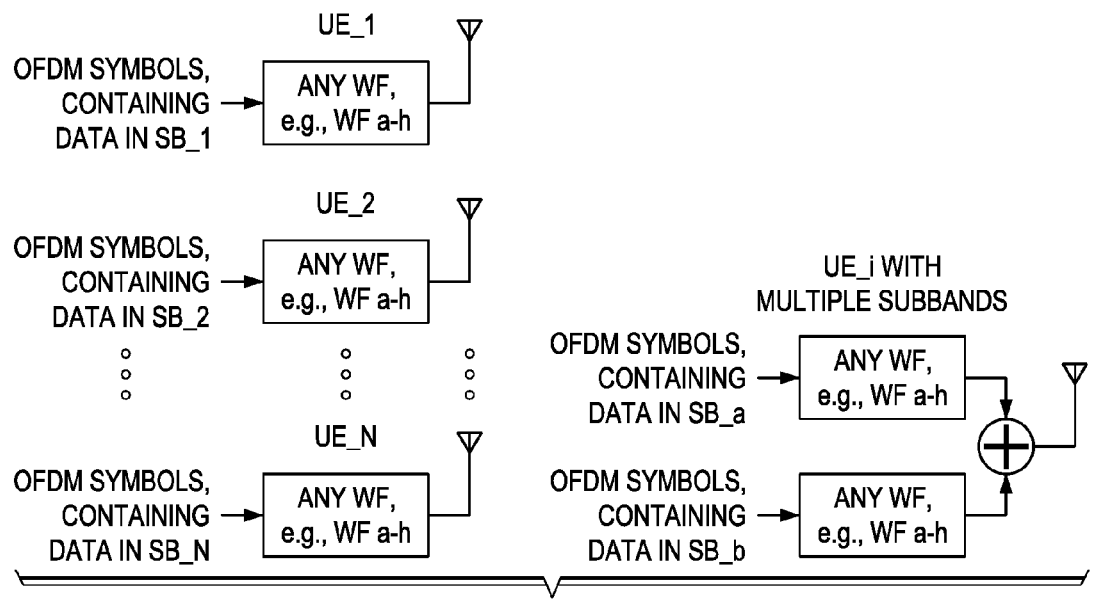
FIG. 12 shows a multicarrier waveform generated by a UE or UEs, or an uplink transmitter or transmitters according to embodiments.

FIG. 12 shows a multicarrier waveform generated by UEs or other uplink transmitters for uplink transmission. Each UE or each transmitter generates an OFDM waveform separately, wherein the waveform is generated by first generating OFDM symbols containing data in subcarriers in at least one subband that the UE is assigned the resource to. Then, the OFDM symbol can be processed by TW and/or filtering to obtain one of waveform WF_a-h to be transmitted. For UL, each UE knows which subbands they are assigned to or allow to send, and it generates waveform that occupies only in that subbands and sends the transmitted signal, separately. The multiple signals from the multiple UEs are superimposed naturally at the receiver (e.g., BS). The receiver can then separate the data since each UE sends data only on the assigned subband. It is possible that multiple UEs transmit data on the same subband, e.g., in grant-free UL or in case a multi-user scheme is used. In this case, a receiver capable of performing more complicated receiving algorithm may be required. In various embodiments in UL, each UE can use a plurality of different subbands and the subbands can have different waveforms and BWs.

Figure 13:
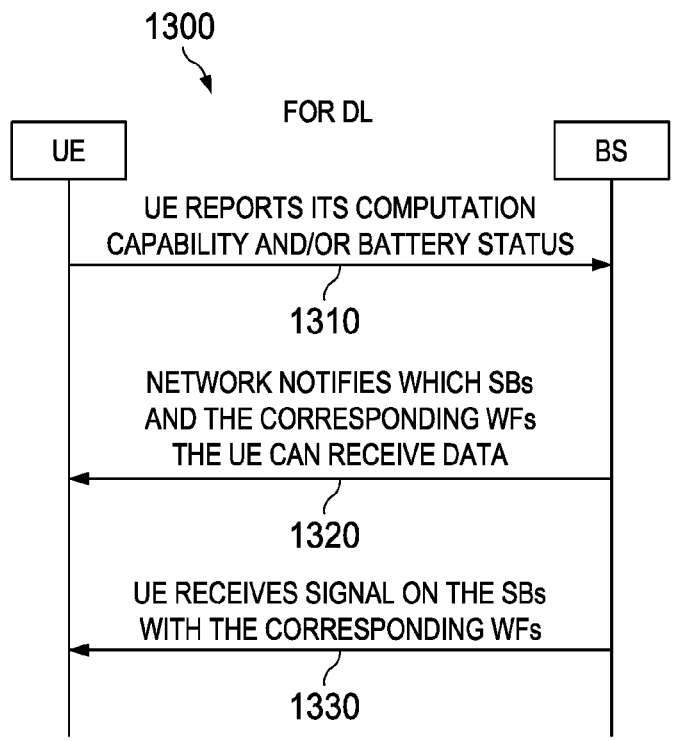
FIG. 13 shows a signaling procedure for downlink (DL) transmission.

FIG. 13 shows a signaling procedure 1300 for a multiband downlink transmission. In a first step 1310, the UE may report its computational capability and/or battery status to a BS or a network. This signaling may only be required when the UE joins the network or reported a low rate for battery status. This information may help the BS or network to determine on which subbands (SBs) the UE should receive the data and what waveforms (WFs) should be used. If the UE has high capability with enough battery, the UE may be assigned to subband(s) with stricter requirement(s) on OOB radiation (e.g. guard band(s)). In the next step 1320, after the determination, the BS or network notifies (sends signaling) to the UE on which SBs the UE can expect to receive the corresponding WF(s) since different WF(s) require different processing capabilities at the UE. For example, if filtering OFDM (F-OFDM) is used for transmitting the data in the subband(s), the receiver at the UE may require the same type of filtering in order to properly recover the data. The signaling can be dynamic signaling or high-level signaling (such as RRC signaling). The subband(s) can be dynamically assigned and signaled to the UE. In various embodiments, WFs for a specific subband can change with lower rate, using high-level signaling, e.g. RRC signaling. Eventually, at step 1330, the UE receives signals on the assigned subband(s) with the corresponding WF(s). In various other embodiments, the BS transmitter can send a waveform that requires more processing power (e.g. performing filtering for a higher OOB requirement) than the receiver on the UE side can perform. In such a scenario, since the receiver can only perform less complex processing (e.g. TW) performance loss may occur at the receiver. However, the OOB requirement still is respected.

Figure 14:
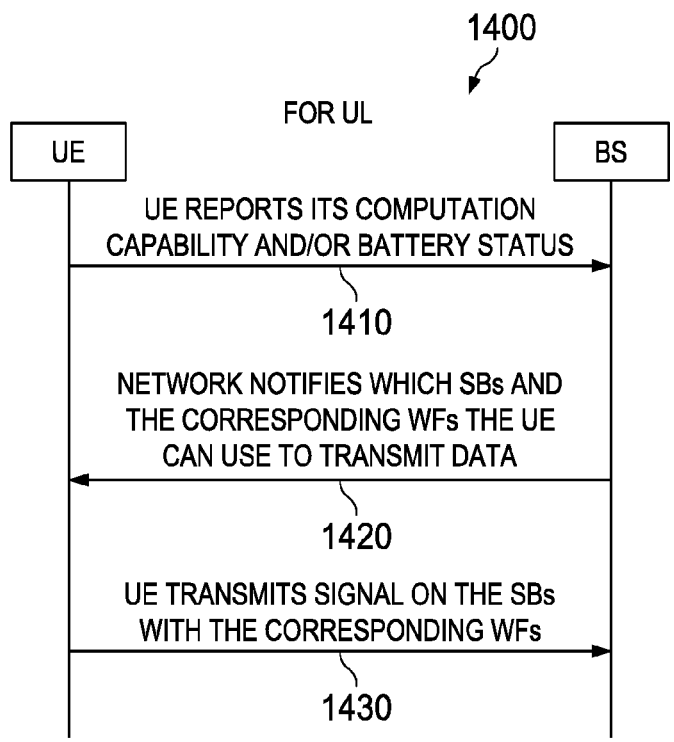
FIG. 14 shows a signaling procedure for uplink (UL) transmission.

FIG. 14 shows a signaling procedure 1400 for a multiband uplink transmission. At step 1410 a UE may report its computational capability and/or battery status to the BS or network. This signaling may be required only when the UE joins the network or reported a low rate for battery status. This information helps the BS or network to determine on which SBs data should be assigned/allowed to the UE for transmission and what WFs should be used. If the UE has high capability with enough battery, the UE may be assigned to subband(s) (e.g. guard band(s)) with stricter requirements on OOB radiation. At step 1420, after the determination, the network or BS can send signaling to the UE on which SB(s) and the corresponding WF(s) the UE may transmit data. The signaling can be dynamic signaling or high-level signaling such as RRC signaling. In various embodiments subband(s) can be dynamically assigned and signaled to the UE, but WFs used can change with lower rate, using high-level signaling, e.g. through RRC signaling. At step 1430, the UE transmits its data using the assigned or allowed SB(s) with the corresponding WF(s).

In some embodiments the network may determine which SBs use which WFs beforehand. In this case, no signaling regarding the WF types is required and a UE assigned to specific SB(s) uses the corresponding WF(s) that is associated with its capability and/or battery status.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A method for transmitting data in a communication system, the method comprising:
performing a first time windowing operation on a first symbol of a first waveform to obtain a first windowed waveform;

performing a second time windowing operation on a second symbol of a second waveform to obtain a second windowed waveform;

transmitting the first windowed waveform carrying a first data in a first band of a carrier; and transmitting the second windowed waveform carrying a second data in a second band of the carrier, wherein the first band and the second band are consecutive bands in the same carrier, wherein the first band is a data band and the second band is a guard band, wherein the guard band separates the data band, and wherein the guard band has a smaller bandwidth than the data band.

2. The method of claim 1, wherein the first band is adjacent to the second band.

3. The method of claim 1, wherein transmitting the first and second windowed waveforms includes transmitting the second windowed waveform synchronously with transmitting the first windowed waveform.

4. The method of claim 1, further comprising modulating symbols for the second waveform with the spectrally contained waveform.

5. The method of claim 4, wherein modulating the symbols for the second waveform comprises modulating the symbols for the waveform with filtered orthogonal frequency-division multiplexing (F-OFDM) or with joint orthogonal frequency-division multiplexing (OFDM) and Offset Quadrature Amplitude Modulation (OQAM).

6. The method of claim 1, wherein the first waveform is a filtered Orthogonal frequency-division multiplexing (F-OFDM) waveform or a OFDM waveform.

7. The method of claim 1, wherein the second waveform is a spectrally contained waveform having a smaller bandwidth than the guard band.

8. The method of claim 1, further comprising:
transmitting the first waveform in the data band to a first node; and
transmitting the second waveform in the guard band to a second node.

9. The method of claim 8, wherein the first node is the same as or different than the second node.

10. The method of claim 1, wherein the second waveform is transmitted in the guard band at a lower power than the first waveform in the data band.

11. The method of claim 1, wherein the guard band is positioned between the data band and a second data band within a bandwidth range.

12. A transmitter for transmitting data in a communication system, the transmitter comprising:

at least one processor; and
a non-transitory computer readable storage medium storing a program to be executed by the processor, the program including instructions for:
performing a first time windowing operation on a first symbol of a first waveform to obtain a first windowed waveform carrying a first data;
performing a second time windowing operation on a second symbol of a second waveform to obtain a second windowed waveform carrying a second data;
transmitting the first windowed waveform in a first band of a carrier; and
transmitting the second windowed waveform in a second band of the carrier, wherein the first band and the second band are consecutive bands in the same carrier, wherein the first band is a data band and the second band is a guard band, wherein the guard band separates the data band, and wherein the guard band has a smaller bandwidth than the data band.

13. The transmitter of claim 12, wherein the first band is adjacent to the second band.

14. The transmitter of claim 12, wherein the transmitter further includes instructions for transmitting the second windowed waveform synchronously or asynchronously with transmitting the first windowed waveform.

15. The transmitter of claim 13, wherein the transmitter further includes instructions for modulating symbols for the second waveform with the spectrally contained waveform.

16. The transmitter of claim 15, wherein the transmitter further includes instructions for modulating the symbols for the second waveform in the second band with filtered orthogonal frequency-division multiplexing (F-OFDM) or with joint orthogonal frequency-division multiplexing (OFDM) and Offset Quadrature Amplitude Modulation (OQAM).

17. The transmitter of claim 12, wherein the first waveform is a filtered Orthogonal frequency-division multiplexing (F-OFDM) waveform or a OFDM waveform.

18. The transmitter of claim 12, wherein the second waveform is a spectrally contained waveform having a smaller bandwidth than the guard band.

19. The method of claim 1, wherein transmitting the first and second windowed waveforms includes transmitting the second windowed waveform asynchronously with transmitting the first windowed waveform.

20. The transmitter of claim 12, wherein the transmitter further includes instructions for transmitting the first waveform in the data band to a first node and transmitting the second waveform in the guard band to a second node.

* * * * *